US012561014B2

(12) United States Patent
Bruwer et al.

(10) Patent No.: US 12,561,014 B2
(45) Date of Patent: Feb. 24, 2026

(54) PRESSURE MOUSE WHEEL

(71) Applicant: AZOTEQ HOLDINGS LIMITED, Nicosia (CY)

(72) Inventors: Frederick Johannes Bruwer, Paarl (ZA); Jean Viljoen, Paarl (ZA)

(73) Assignee: AZOTEQ HOLDINGS LIMITED, Nicosia (CY)

( * ) Notice: Subject to any disclaimer, the term of this patent is extended or adjusted under 35 U.S.C. 154(b) by 0 days.

(21) Appl. No.: 18/890,933

(22) Filed: Sep. 20, 2024

(65) Prior Publication Data

US 2025/0093981 A1      Mar. 20, 2025

(30) Foreign Application Priority Data

Sep. 20, 2023    (ZA) ................................. 2023/08881

(51) Int. Cl.
| | |
|---|---|
| *G06F 3/038* | (2013.01) |
| *G06F 3/01* | (2006.01) |
| *G06F 3/0354* | (2013.01) |
| *G06F 3/0362* | (2013.01) |

(52) U.S. Cl.
CPC ............ *G06F 3/0383* (2013.01); *G06F 3/016* (2013.01); *G06F 3/03543* (2013.01); *G06F 3/0362* (2013.01)

(58) Field of Classification Search
CPC .... G06F 3/0383; G06F 3/016; G06F 3/03543; G06F 3/0362
See application file for complete search history.

(56) References Cited

U.S. PATENT DOCUMENTS

| | | | |
|---|---|---|---|
| 5,530,455 A * | 6/1996 | Gillick | G06F 3/0485 345/163 |
| 5,712,725 A | 1/1998 | Faltermeier et al. | |
| 5,771,038 A | 6/1998 | Wang | |
| 6,198,473 B1 * | 3/2001 | Armstrong | G06F 3/03543 345/163 |
| 6,859,196 B2 | 2/2005 | Kehlstadt | |
| 6,879,316 B2 | 4/2005 | Kehlstadt et al. | |
| 7,623,116 B1 | 11/2009 | Bidiville | |
| RE42,064 E | 1/2011 | Fish | |
| 10,379,637 B2 | 8/2019 | Perret-Gentil et al. | |
| 11,656,694 B2 | 5/2023 | McLoughlin et al. | |
| 11,989,361 B1 * | 5/2024 | Vlasov | G06F 3/03543 |
| 2002/0067334 A1 | 6/2002 | Hinckley et al. | |
| 2002/0180701 A1 | 12/2002 | Hayama et al. | |
| 2003/0107547 A1 * | 6/2003 | Kehlstadt | G06F 3/03543 345/156 |
| 2004/0174336 A1 | 9/2004 | Bohn | |
| 2005/0088413 A1 * | 4/2005 | Brewer | G06F 3/03543 345/157 |
| 2006/0108999 A1 * | 5/2006 | Lee | G06F 3/0362 324/207.2 |
| 2007/0188455 A1 | 8/2007 | O'Connell et al. | |
| 2007/0200826 A1 * | 8/2007 | Zeng | G06F 3/0485 345/166 |
| 2008/0243375 A1 | 10/2008 | Han | |

(Continued)

*Primary Examiner* — Ariel A Balaoing
(74) *Attorney, Agent, or Firm* — Mattingly & Malur, PC

(57) ABSTRACT

A method of measuring wheel parameters of a user interface and using such information to implement a freewheeling (virtual rotation) output that operates independent of real rotation of the wheel. A specific application can be found in computer mouse products.

13 Claims, 10 Drawing Sheets

(56) References Cited

U.S. PATENT DOCUMENTS

| | | | | |
|---|---|---|---|---|
| 2010/0073291 A1* | 3/2010 | Hisatsugu | ........... | G06F 3/03548 |
| | | | | 345/184 |
| 2010/0085321 A1 | 4/2010 | Pundsack | | |
| 2012/0026090 A1* | 2/2012 | Zielke | ................. | G06F 3/03543 |
| | | | | 345/163 |
| 2013/0120262 A1* | 5/2013 | Piot | ..................... | G06F 3/03547 |
| | | | | 345/163 |
| 2014/0015752 A1* | 1/2014 | Lin | ..................... | G06F 3/03543 |
| | | | | 345/166 |
| 2019/0121452 A1* | 4/2019 | Hsueh | ................. | G06F 3/03543 |
| 2021/0286448 A1* | 9/2021 | Dunant | ................. | G06F 3/0362 |

* cited by examiner

PRESSURE MOUSE WHEEL

The present application claims priority from South Africa application ZA 2023/08881, filed Sep. 20, 2023, contents of which is hereby incorporated by reference into this application.

BACKGROUND

This invention relates, in broad terms, to a switch which functions due to inductive effects and, more particularly, to a computer mouse in which that type of switch is employed.

On/off switches, which make or break ohmic contact while providing tactile user feedback are widely used. This type of switch requires connections to a circuit and is actuable by force or movement which is applied to the switch by a user.

For example a dome switch, when depressed by a user, snaps, gives a tactile response and makes an ohmic contact that is detected by a circuit. This type of switch has a single make-point which, importantly, is well aligned with the "snap" of the dome. The switch cannot give multilevel displacement information. Another factor is that the switch may fail if grime or water adversely affect the ohmic contact.

In a computer mouse depression of the mouse wheel results in a switching action which enables respective functions to be selected. The mouse is also used for scrolling a display on a computer screen. The mouse can be "woken up" from a sleep mode by means of a capacitive touch from a user although this might not happen if the user wears a glove.

SUMMARY OF THE INVENTION

In a computer mouse the speed of rotation of the center wheel is directly linked to physical turning of the wheel. In contrast virtual rotational scrolling on a computer screen, as perceived by a user, can occur even though the center wheel of the mouse is stationary or if it is rotating at a different speed than what is reported by the mouse.

The present invention is concerned with a switch that does not require an electrical connection to a circuit in a product, which does not function by making or breaking ohmic contact and which can provide information on movement or displacement of a switch structure due to user actuation or in terms of a metric of user force applied to the switch structure.

In a snap dome or other spring-based switch a feedback force is produced in response to a force which is applied by a user. There is also a tactile feedback when such switch is depressed beyond a certain point.

In accordance with this invention a sensor, for example a capacitive, inductive or Hall effect device, is used to detect if any force is applied to a switch mechanism, or to determine switch movement or to provide a metric of force applied by a user to a switch mechanism. A switch based on this principle offers the benefit that moving parts can be totally sealed from the electronics or external circuitry because no circuitry connections are required, and multi level displacement or multi point movement measurements can be made.

In one embodiment a switch according to the invention includes a mechanism which provides tactile user feedback when actuated beyond a predetermined point or a distance of travel. This aspect is related to or dependent on a force which is exerted on a component of the switch. A moving part of the switch includes a sensor influencing member that causes a measurement to be made by an adjacent sensor in electronic circuitry of a product when displacement of the moving part occurs. An ohmic or galvanic connection is not required.

For a Hall effect sensor a magnet is required and the Hall effect sensor can be used to determine a distance between the sensor and the magnet. As such, movement can be detected when the switch is actuated.

For an inductive sensor the influencing member may be a magnetic, ferrite or conductive material, subject to the following:

Magnetic influencing member: A sensing inductor is covered with a ferrite material and when an adjacent magnet moves closer to or away from the inductor, the ferrite material is affected and the measured inductance changes.

Ferrite influencing member: The measured inductance of a sensing inductor is enhanced when a ferrite member moves closer to the inductor. The change in the measured inductance is more pronounced if the ferrite member is moved into a core of the inductor.

Influencing member of metal or other conductive material: A material with a low permeability negatively affects a sensing inductor and movement, particularly into a core of an inductor, can be detected. Movement into the core of the inductor offers further advantages.

In an embodiment of the invention an inductive displacement sensor of the aforementioned kind, designed to form a part of a push button type switch such as that found in a computer mouse, can be installed under an axle of the center wheel of the mouse to be actuated when the wheel is depressed by a user.

In accordance with this invention no ohmic contact is required to make a "switch activated" decision. A moving part of the switch comprises an influencing member that affects the measured inductance of a sensing inductor that, for example, may be a part of a printed circuit board (pcb) under or close to the switch. The switch can then be used to detect a physical touch on the mouse wheel i.e. to detect when a user's finger contacts the mouse wheel, or moves out of contact with the wheel.

In this type of switch, detection of a switch activation, allows for the selection of functions as per the state of the art. Ohmic contact may or may not be required for the "click or activation decision". Additionally the switch has a capability to provide information of the user making physical contact (touching) with the mouse wheel and of moving out of physical contact with the mouse wheel.

Contact information derived from sensing any force on the mouse wheel may be used to wake-up circuitry in the mouse and to detect gestures on the mouse wheel. For example, when a user wants to spin the mouse wheel, information relating to contact or non-contact with the mouse wheel combined with information on the rotational speed of the wheel when contact is interrupted can be used to create a freewheeling effect in software which results in a freewheeling display on a screen of a computer linked to the mouse.

An advantage is that the switch performs a dual purpose of enabling function selection by means of switch activation, and of detecting a physical touch or force on the switch. The non-contact mechanism increases the reliability of the switch as wear, water and grime cannot affect the switch decision. Even the slightest touch on the wheel can be detected. The switch can still provide a tactile feel, or the tactile feel can be achieved through haptics that are external to the switch.

In another embodiment a force sensing mechanism of the kind described, or another force sensing mechanism, may be attached to the mouse wheel axle or to structure supporting the wheel. In this case it is possible to detect more vectors of force exerted on the mouse wheel, for example backwards, forwards or downwards. Using this information, "freewheeling" i.e. scrolling fora long period is enabled using software techniques without the mouse wheel turning, this is actually equivalent to virtual i.e. not real rotation of the wheel. And although the center mouse wheel is mostly referenced in the examples, the invention as described here can also be the thumb wheel of a mouse or in fact any user interface wheel application.

In another embodiment to detect touch on the mouse wheel, a ratchet mechanism made of conductive material runs on a conductive part of the mouse wheel. The rachet mechanism may form a part of suitable circuitry. By using capacitive sensing technology a user touch to the mouse wheel may be detected. The ratchet mechanism also provides a click feeling as the wheel is turned.

By using touch and release information freewheeling can be implemented in software and various algorithms can be followed to maintain or fade out the "speed" of rotation i.e. the speed as perceived by a user on a computer screen.

Implementation of a freewheeling function by making use of the detection of force applied to the mouse wheel and information pertaining to the speed of rotation of the wheel offer several advantages compared, for example, to using information derived from sensing a capacitive touch or proximity to the wheel. Capacitive sensing is prone to many factors which influence capacitive measurements and if a user operates a computer mouse using a glove, the sensing technique may fail.

The measurement or detection of force exerted by a user on a wheel, using inductive sensing technology is effective. Wheel rotation can be measured optically or with Hall sensing mechanisms related to a magnet which is attached to an axle of the wheel. On-axis or off-axis Hall sensing options may be considered.

When a user puts a digit onto the center wheel, movement thereof will be affected and such movement can be detected. Unlike capacitive touch sensing where no movement is necessary, the requirement for physical displacement is a more robust solution and specifically more robust against any ground plane or object coming into close proximity of capacitive sensing structures.

This also makes it irrelevant if the user wear gloves.

For a virtual freewheeling function (i.e. the wheel does not physically rotate for an extended period) user interaction with the wheel is monitored through the measurement of the displacement of the switch. A typical sequence when a user flicks the wheel would be as follows:

From a stationary position and no force on the wheel:
Force on the wheel is detected and rotation is monitored;
As the wheel turns data is fed to a computer;
When a loss or reduction of force is detected and the wheel is still spinning at a speed above a predefined rate of rotation the virtual freewheeling function is implemented; and
Even if the wheel has very low inertia or high rotational friction and almost immediately slows down or stops, the virtual wheel rotation can be maintained and tapered off by using a selected algorithm in software.
The direction of rotation is taken into account.
The computer mouse can implement this stand alone, i.e. it will provide rotation information to the computer as if the wheel is literally still rotating. Or the freewheeling can be implemented in the operating system.

With the virtual freewheeling active (i.e. the user spun the wheel with finger going out of touch) the wheel can actually stop dead whilst the virtual freewheeling is still active and ongoing. A next event of touch on the wheel can then stop the freewheeling. With the wheel stationary any rotation on the wheel can also be used to stop the freewheeling. With the wheel still in motion whilst freewheeling is happening, any abrupt stop or reversal of rotation will also halt the freewheeling.

The incorporation of the interfering member on a computer mouse can be achieved by modifying a switch which typically is included in a computer mouse, or by means of a mechanism that is also in contact with an axle of the wheel, the mechanism being positioned so that when the switch is pressed the mechanism causes the inductance of an inductor on a printed circuit board to be affected.

In a specific embodiment the invention provides a computer mouse comprising a housing, a center wheel which is rotatably mounted to the housing, a first sensor which in response to force on the center wheel produces a first signal related to said force, a second sensor which in response to rotation of the wheel produces a second signal related to said rotation, a controller and wherein the controller, responsive to the first and second signals, implements a freewheeling output independently of continued rotation of the center wheel.

Preferably the first sensor comprises an inductive measurement system.

In one example the second sensor comprises a magnet which is attached to an axle of the center wheel and a Hall effect sensor which is responsive to movement of the magnet.

The controller comprises a processor with suitable software. An operating system of the computer may complement the control function In an embodiment the switch related to the center wheel can be mounted on a metal plate that bends closer to the pcb when pressure is exerted onto the main mouse wheel. The switch closure can either short out ends of an interfering member to have a bigger Eddy current effect, or the end of an inductor, or the metal plate can be formed in two separated parts soldered into the pcb and routing the switch connections to pcb for detection of the ohmic closure of the switch. i.e. two inductive and one ohmic switch closure detection mechanisms.

The virtual freewheeling can be augmented with haptics or through the use of a buzzer to indicate to the user that the virtual wheel is still rotating.

In another embodiment the force is used as a metric to gear the physical rotation up or down. For example, a very high resolution in scrolling can be selected by using a little more force on the center wheel than normal, or less force than normal.

Similarly a force metric may be used for virtual fast scrolling.

The amount of force on the wheel may also be used to control a user selected function in an operating system, for example a temporary "zoom in" function which is frequently used by CAD operators and graphic designers, to quickly and temporarily zoom in on a feature. The zoom level is returned to normal once the force is released.

If it is difficult, for example to have a switch manufacturer to modify a switch for incorporation of the interfering member, it is possible to create a separate mechanism that is also in contact with the axle that affects the inductance of an inductor on the main pcb when the switch is pressed.

Preferably the switch mechanism of a conventional mouse is replaced with a non-contact switching mechanism, and the click feeling (ratchet and switch) is done with haptic mechanisms. This haptic engine may in fact form a part of an inductive measurement construction. Accordingly, the inductor that is used to measure displacement as the user exerts a force on the mouse wheel, is also used in the haptic signal generation.

This construction of using the same inductor to measure a force and also to generate a haptic feedback signal can also be applied to applications other than mouse products, for example switches or trackpad force sensing and haptic implementations. The exact same implementation is used and in one mode the inductance of the inductor is measured and a change in a measured inductance is related to a displacement which is related to an applied force (same as onto the mouse wheel), and in a second mode a Voltage signal is applied over the inductor and this creates an electromagnetic effect that results in a haptic signal being generated.

If a conventional (ohmic) switch with a tactile click is used, it is important to align the switch "make" decision with the tactile click.

Inductance is measured using suitable integrated circuits (IC's) that are connected to the inductors.

BRIEF DESCRIPTION OF THE DIAGRAMS

The invention is further described with reference to the following drawings in which.

DETAILED DESCRIPTION ON THE INVENTION

The following description of the appended drawings is presented merely to clarify the spirit and scope of the present invention, and not to limit such scope. The drawings only show embodiments in example applications. A large number of alternative or equivalent embodiments and applications may exist which will still fall within the scope of the claims for the present invention.

Although the description is mostly made in terms of inductive switch operation in combination with the normal switch positioned in a computer mouse to select functions via the application of force on a center mouse wheel, any other mechanism based on force applied to the mouse wheel is part of this invention.

6

Figure 1:
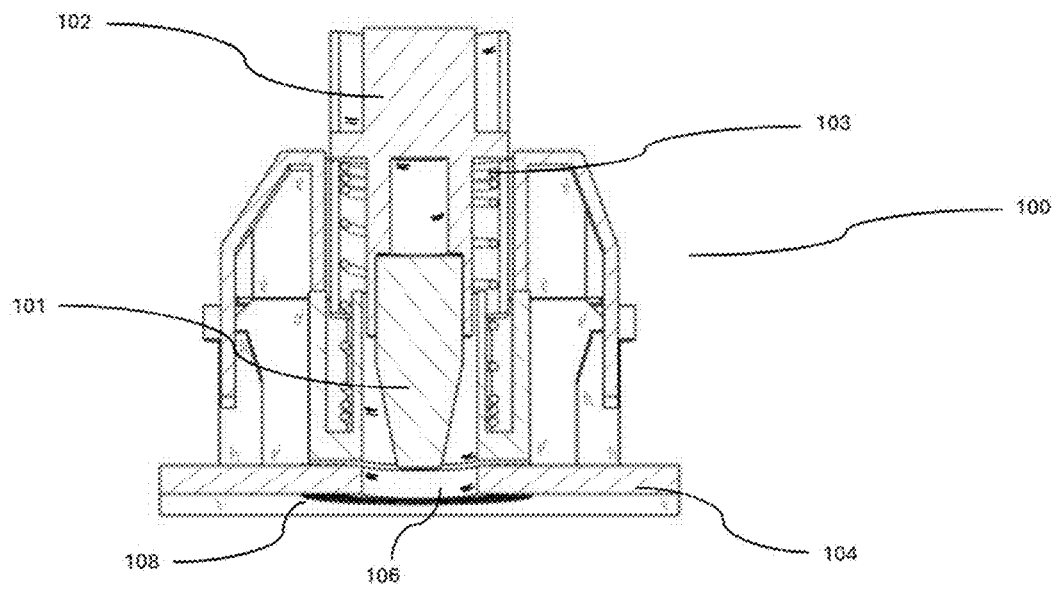
FIG. 1 shows a switch comprising an influencing member as part of a switch part that is displaced under an actuation force.
Figure 2:
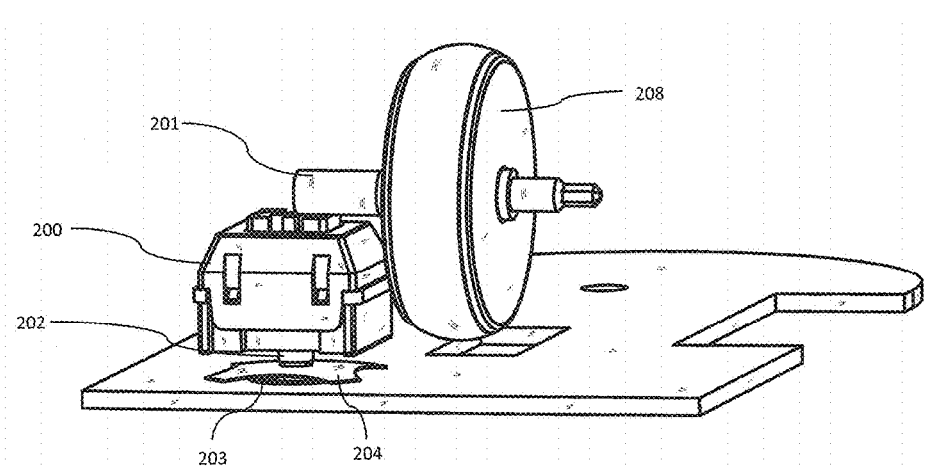
FIG. 2 shows an inductive sensing switch mechanism which is positioned under a typical mouse wheel axle with an inductor formed on a pcb directly below an influencing member.

FIGS. 1 and 2 show an inductive sensing switch 100.

An advantage of an interfering member 101 shaped as shown in FIG. 1 is that it is already in a range that strongly influences the inductive measurement i.e. the slightest displacement can be measured and detected.

The interfering member 101 is just inside a hole 106 in a core of an inductor 108 on a pcb 104 when no force is exerted on a mouse wheel 208 (FIG. 2). A spring 103 provides back-pressure on a moving part 102 of the switch. The back pressure and tactile feeling can also be augmented with a dome plate 204, as shown in FIG. 2 which may be positioned inside the switch 100. The interfering member 101 in FIG. 2 protrudes through the hole in the dome plate into the influence of the inductor core. An end 202 of the interfering member is designed with a shoulder a short distance above the dome plate so that under user actuation a very slight movement (ideally almost imperceptible to users) is possible before the dome plate exerts more backwards force. The wheel 208 exerts a force on the moving part 102 (FIG. 1), via an axle 201 mounted adjacent a switch housing 200.

A spring mechanism 103, for example as shown in FIG. 1, may provide a soft back-force for a short travel and, when the dome switch comes into play, more back-force will be provided until the snap occurs.

The snap dome collapsing may also augment a change in inductance due to the interfering member displacement, especially if a metal (not ferrite) material is used.

If a ferrite interfering member is used it is better to have the dome switch further away from the inductive coil to prevent the metal of the dome plate affecting the inductance in an opposite way compared with the ferrite.

Figure 3:
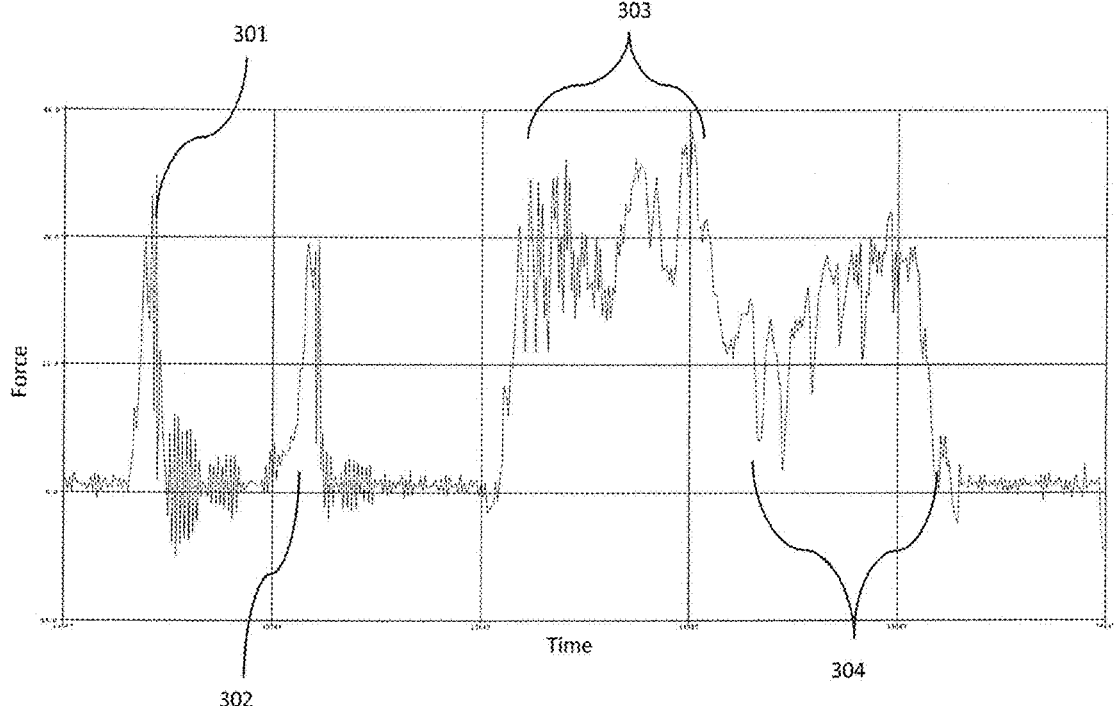
FIG. 3 shows graphs of force measurements during operation of a center mouse wheel.

FIG. 3 shows the typical force or pressure measured on the center mouse wheel, for gestures to flick the wheel forwards or backwards in order to effect virtual freewheeling. The peaks 301 and 302 are forward and backwards respectively indicating very similar force for both cases. The signals shown at 303 and 304 are for slow scrolling forwards and backwards. The measurements show a clear return to a resting position value when no pressure is exerted on the wheel. This will allow easy recognition of when the user gets in contact with the wheel and also when the user lose contact with the wheel.

In another embodiment the center mouse wheel is mounted on a cradle that allows for a level action on the switch linked to the center wheel. This results in less off center vertical movement on the wheel axle and this may be beneficial for magnetic rotational measurements. The center wheel pressure switch is mounted in a position below the cradle and when the wheel is pressed downwards the switch is under pressure.

In another embodiment the ability to perform virtual rotation at various speeds allows for the selection of functions such as zooming in or out. A program selection may indicate a requirement for a very fine movement, for example on a drawing or in a map, or the user may select this feature. The mouse will then adjust the coefficient between the physical scrolling and the virtual scrolling to require much more rotation for a small cursor movement. A similar process can be used for increased virtual scrolling to effect faster movement.

The zooming in and out as per above may also be related to a magnitude of the force exerted by a user on the center mouse wheel.

The damping and subsequent stop of the virtual scroll may be linked to the user interface display, e.g. when approaching an end of a long spreadsheet or a web page through fast virtual scrolling, the scrolling will slow down in relation to the end of the document or page approaching and subsequently stop once the end is reached.

Figure 4A:
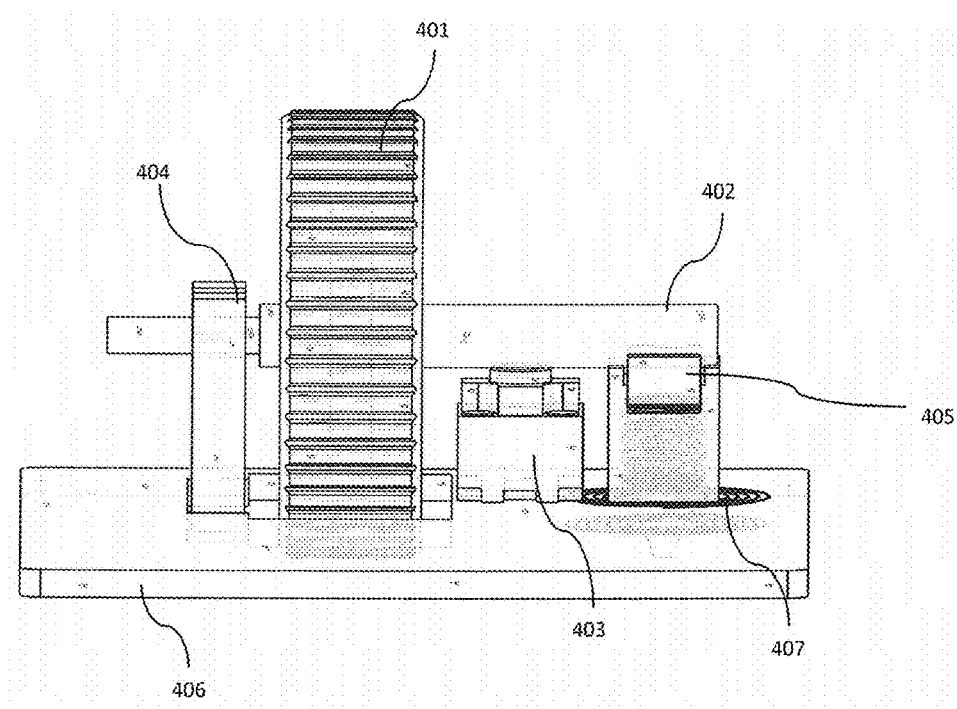
FIGS. 4a and 4b illustrate an inductive displacement measurement mechanism.
Figure 4B:
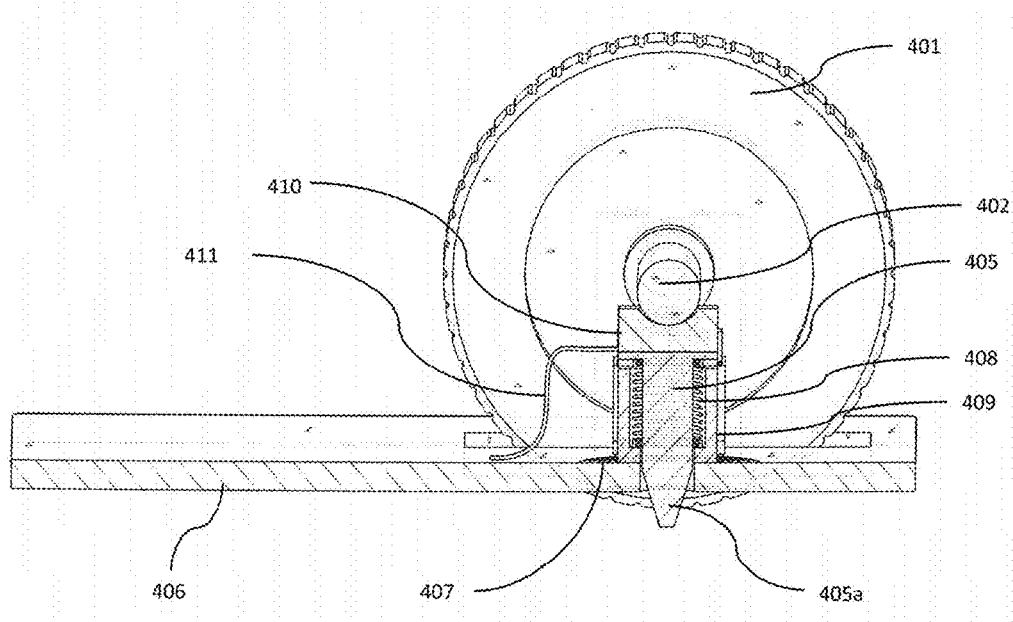

FIGS. 4a and 4b show an exemplary configuration wherein inductive force sensing is implemented in conjunction with an electromechanical switch 403. When a user exerts force on a wheel 401, an axle 402 is pressed downwards onto the switch 403 and if enough force is exerted the switch 403 will close. Electronic circuitry connected to the switch will detect this event. In a traditional mouse that is the full situation. However since in accordance with this invention it is important to detect when a user has a digit on the wheel (even if much less force is exerted than what is required to activate the switch 403) the sensing mechanism can be implemented as per FIG. 4. A housing or structure 409 keeps the parts aligned and in position. A metal structure/rod 405 is in contact with the axle 402 such that any up or down displacement of the axle 402 is transferred to the rod 405. A bottom end of the rod 405 acts as an interfering member 405a that penetrates the core of a coil 407 (a flat bottom part that covers the coil may also be considered). Any such movement of the axle 402 affects the inductance of the coil 407 which is measured by an inductive measuring system or IC (not shown).

The inductive coil 407 may be a part of a main pcb or may be a discrete component mounted onto the main pcb. The mechanical construction includes a spring 408 that pushes the rod 405 up against the axle. This is ideally a very light spring and ideally pushes the axle up to very slightly loose contact with the switch 403 surface. Any downward force will then overcome the spring force and, as such transfer a small displacement onto the interfering member 405, 405a to facilitate movement and direction detection of the rod/axle through the inductive measurements.

The moment the axle comes into contact with the switch 403, the switch backward pressure will dominate and the user will experience the traditional feel of the switch 403 i.e. no discernable change in user experience including when the switch clicks and provides its normal tactile feedback.

In another embodiment of the invention, inductive sensing is used to detect user contact (with a slight force) on the mouse wheel and also the exact moment the push button switch is pressed hard enough to switch or "click".

In FIG. 4b an haptic actuator or haptic signal generator 410 is shown that will provide haptic feel to the mouse wheel. The said haptic actuator 410 is electrically connected to the controller or haptic driver through connections 411.

Figure 5A:
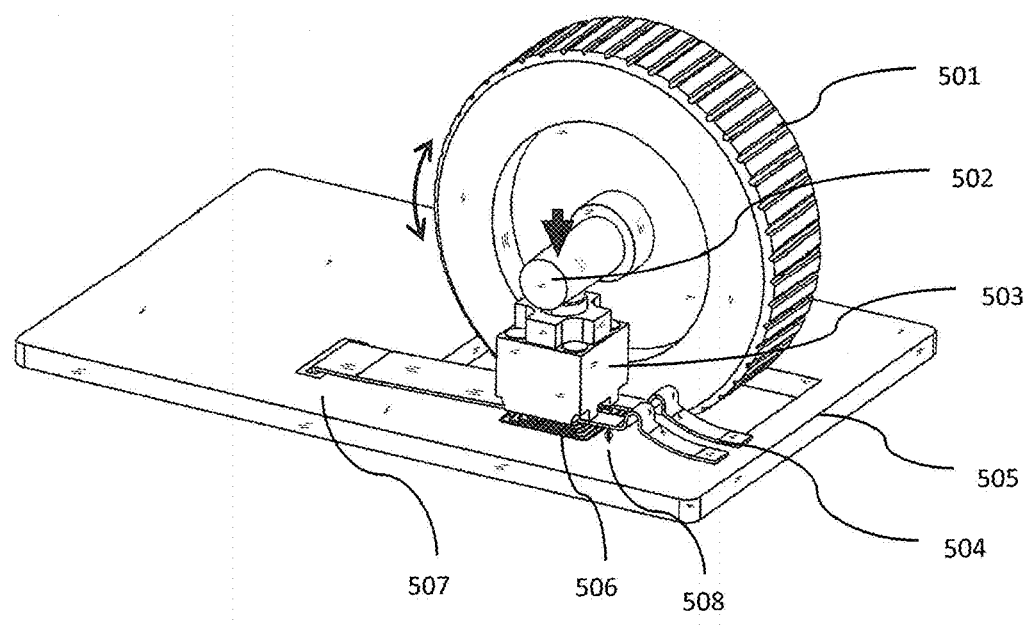
FIGS. 5a,5b and 5c show a combined inductive displacement/touch measurement and switch closure detection.

In FIG. 5a a side view is shown with a conventional push button switch 503 positioned below an axle 502 of a mouse wheel 501. The switch 503 is mounted on a metal strip 504 which is soldered (507) (or otherwise fixed) onto a pcb 505 for mounting purposes. An inductive coil 506 formed for example with tracks on the pcb 505 is positioned below the strip 504.

With a downward force on the mouse wheel 501, the metal strip 504 is pressed down towards and onto the pcb 505. This means the distance between the metal strip 504 under the switch 503 moves closer to the surface of the pcb 505 and also the inductive coil 506. This will measurably affect the inductance value of the inductive coil 506. The strip 504 must be designed (material and shape) to allow even a soft touch of the user, in order to operate the mouse wheel 501, to be detected. A distance 508 between the strip 504 and the pcb 505 only needs to be some 10's of microns.

The movement of the strip 504 can be detected and direction (up or down) can be determined from the inductance measurements of the inductive coil 506.

Figure 5B:
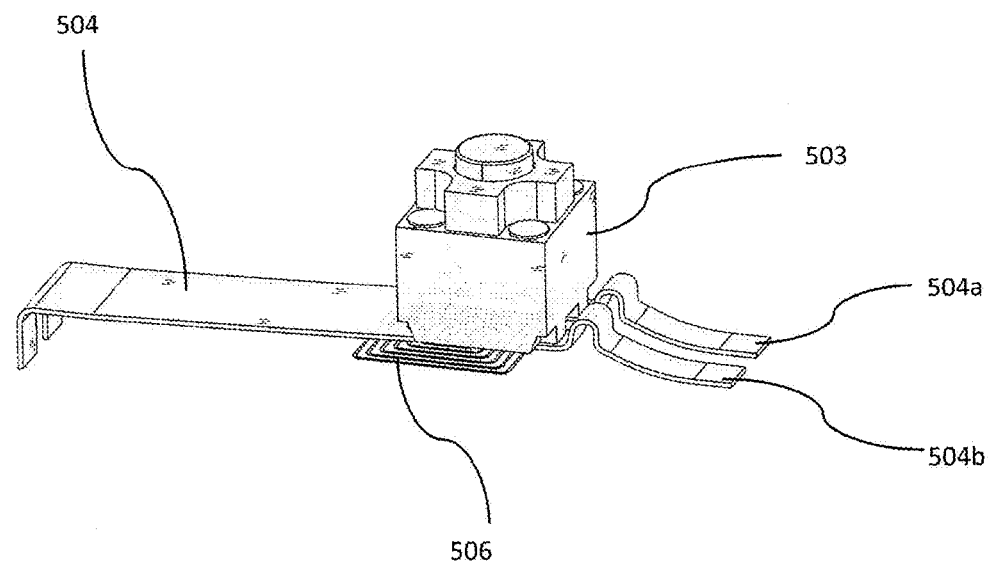

In FIG. 5b the strip 504 and the switch 503 are shown from above. The switch 503 is soldered onto two separated extensions 504a and 504b of the strip and when the switch is activated (clicked/closed) the two extensions 504a, 504b are electrically shorted.

There are two methods of affecting the inductance of the inductive coil 506 under consideration. The first one is to change the distance between the strip 504 and the coil 506. This will allow detection of a touch of the user on the mouse wheel 501 to operate the wheel 501 and also when the user finger is lifted off the wheel 501. The second method is to close the switch 503 which affects the inductance, in accordance with "Lenz's Law". Eddy currents will form in the strip 504 above the coils 506 and when the switch 503 is closed an electrical path is formed between sections 504a and 504b allowing more Eddy current flow. This alters the measured inductance of the inductive coil 506 significantly, making it easy to accurately detect the moment of switch "click"/closure. This an important matter since a "click" without switch closure or switch closure without a synchronized "click" is not acceptable.

The detection of when the user's digit loses contact with the mouse wheel 501 is an important metric to implement freewheeling also using the rotational speed of the wheel 501 at the time of the digit losing contact. The event of the user digit getting into contact with the wheel is important for waking up or stopping freewheeling.

The shape of the strips 504 and the implementation of the inductive coils 506 are exemplary and there are many variants possible. The switch 503 can be a standard preferred switch of each mouse manufacturer or even a dome switch plate.

The inductive coils (407, 506) may be on a one layer pcb or on a multiple layer pcb, or may be discretely formed. The coils are connected to an inductive measurement IC, (not shown) which measures the inductance.

Figure 5C:
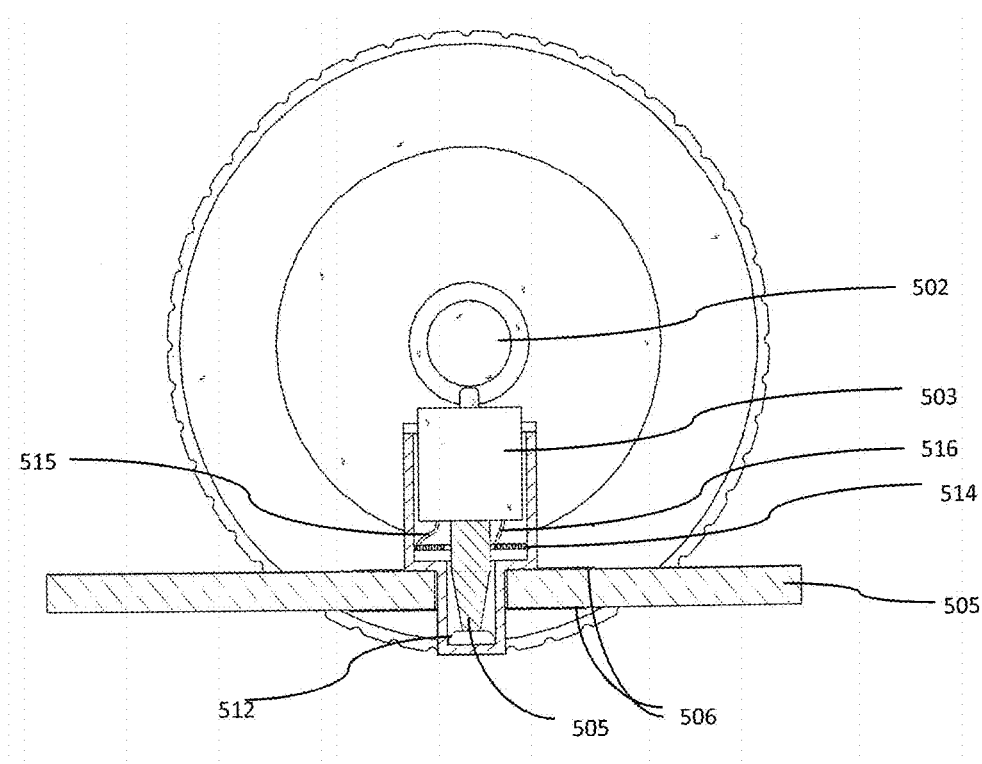

In FIG. 5c another implementation that allows detecting through inductive measurements of user contact (slight downward movement) with the center mouse wheel as well as activation (closing) of the switch 503 is shown. For contact detection, the axle 502 of the wheel, comes into contact with the switch 503. When downward pressure is applied to the wheel, the pressure is transferred through the switch 503 to push an interfering member 505 against the spring 512 and moving the interfering member 505 deeper into the core of the inductor 506, and in the process changing the inductance of the inductor 506.

For detecting the switch 503 closure, the ends 515, 516 of an inductor 514 that is wound around the interfering member 505, are shorted out when the switch 503 is activated. The inductors 514, 506 and the interfering member 505 form a transformer and this allows the closing of the switch 503 to significantly (compared with the displacement changes in inductance) affect the measured inductance of inductor 506.

In the specification above various ways are described to detect downward pressure (or no pressure) on the center wheel of a mouse and also to distinguish when enough downward pressure is exerted to activate (click) a conventional push button switch affected by the mouse wheel downward pressure. The conventional switch is retained mainly to keep the "feel" of mouse wheel operation the same.

Below descriptions are given where the traditional switch can be removed and where haptics are used to provide the user feedback.

In FIG. 6 an exemplary construction is shown wherein an inductive measurement coil (to measure and detect displacement) is combined with a haptic feedback signal generation mechanism. The haptics can also be generated using a separate mechanism such as an LRA or piezo element, but this adds extra cost and components.

An objective is to implement a haptic mechanism that will emulate the tactile feeling provided by a traditional switch 407 without using such a switch. In FIG. 6 such exemplary implementation is shown based on a solenoid type method.

This method has several advantages. For example, since no ohmic contact is required there is less wear and tear over time and with usage. The haptic signal is generated once a decision has been made that enough pressure was exerted. As such the haptic signal and the switch activation event are naturally in synchronization. And, unlike with a traditional electromechanical switch, the level of force or travel required for switch activation can be adjusted in software.

Figure 6A:
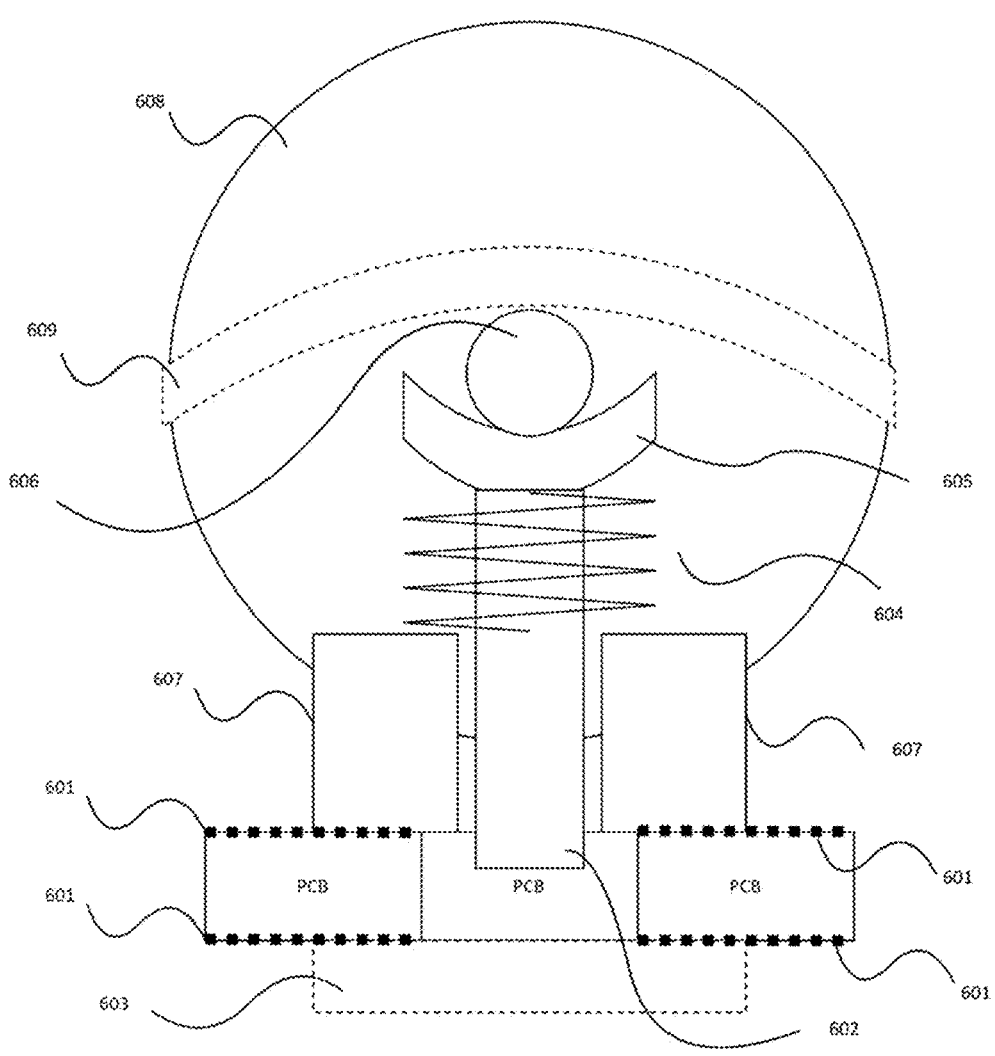
FIGS. 6a, 6b, 6c and 6d show integrated inductive measurement and haptic signal generation construction options.

In FIGS. 6a, b and c the construction of a combined haptic generator and inductive force sensor is shown. When a user exerts pressure on a wheel 608, an axle 606 is pressed downwards onto a cradle 605.

A housing or structure 607 keeps the parts aligned and in position and is only shown where it aids in clarifying the drawings. The cradle 605 is in contact with the axle 606 such that any displacement of the axle 606 is transferred to the cradle 605. A bottom end of the cradle 605 has a magnetically permeable interfering member 602 that approaches an inductive coil 601 or penetrates the core of the coil 601. Any movement of the axle 606 affects the inductance of the coil 601 which is measured by an inductive measuring system.

The inductive coil 601 may be a part of a main pcb, which may be single or multi layered and the coil 601 may be a discrete component mounted onto the pcb or housing 607. The mechanical construction includes a spring 604 that pushes the rod up against the axle. The spring may be a helical type or it may use bending members to create a force. The spring 604 must be light enough so the user's touch on the wheel can compress it. Any downward force will then overcome the spring force and, as such, transfer a small displacement onto the interfering member 602 to facilitate movement and direction detection of the rod/axle through the inductive measurements.

Apart from measuring force the coil 601 and the magnetically permeable interfering member 602 fulfill additional roles in generating force. When a current is passed through the coil 601, a magnetic field is generated that pulls the interfering member 602 into the core of the coil 601. This force will compress the spring 604 and with enough force the interfering member 602 can create a tactile effect on the wheel 606. Depending on the spring and weight, the unit will also exhibit a natural frequency that can be used for haptic vibration. This force can be used to provide tactile or haptic feedback to the user, for example, when the inductive force measurement shows a sufficient activation, tactile or haptic feedback can be created to emulate a switch activation.

Optionally a permanent magnet 603 fixed to the pcb can be used to allow bi-directional forces. When a current is passed through the coil 601 in a certain direction, a magnetic field is induced in the interfering member 602 that opposes the magnetic field of the permanent magnet 603. The opposing fields will cause the interfering member 602 to be pushed away from the permanent magnet 603 exerting an upward force.

Conversely, when a current is passed through the coil 601 in the opposite direction, a magnetic field is induced that aligns with the magnetic field of the permanent magnet 603.

The aligned fields will cause the interfering member 602 to be pulled towards the permanent magnet 603, exerting a downward force.

Alternatively, instead of a permanent magnet, a magnetically permeable (i.e. ferrite, metal) member 603 can be fixed to the pcb. The magnetically permeable member provides a return path for the magnetic field generated by the coil 601, increasing the force acting on the interfering member 602.

In an alternative embodiment, the interfering member 602 can be made of an easily magnetizable, low coercivity material and the member 603 can be magnetically permeable. In such an embodiment, passing a large enough current through the coil 601 will permanently magnetize the interfering member 603. The magnetized interfering member 602 will be pulled magnetically towards the magnetically permeable member 603. When current flowing through the coil 601 is halted, the interfering member 602 will remain magnetized and continue exerting a force without any power requirement until the current through coil 601 is reversed and the interfering member 602 is demagnetized.

An optional friction member 609 can be employed to implement tactile feedback through rotational resistance on the axle 606 and hence on the wheel 608. The friction member 609 pushes down on the axis 606, causing a rotational friction force proportional to the amount of normal force. When one of the mechanisms mentioned in the previous paragraphs is used to alter the amount of force exerted upward or downward by the interfering member 602, the same mechanism can be used to alter the rotational friction force exerted on the wheel through the optional friction member 609.

FIGS. 6a, b, c and d illustrate exemplary mechanisms using a solenoid to generate the force required to provide feedback. In FIG. 6a, a multi-layer pcb-coil 601 is used with a hole in the pcb for the core of the inductor. The interfering member 602 can move in and out of the core, modifying the measurable inductance, and allowing forces to be exerted on the interfering member 602.

Figure 6B:
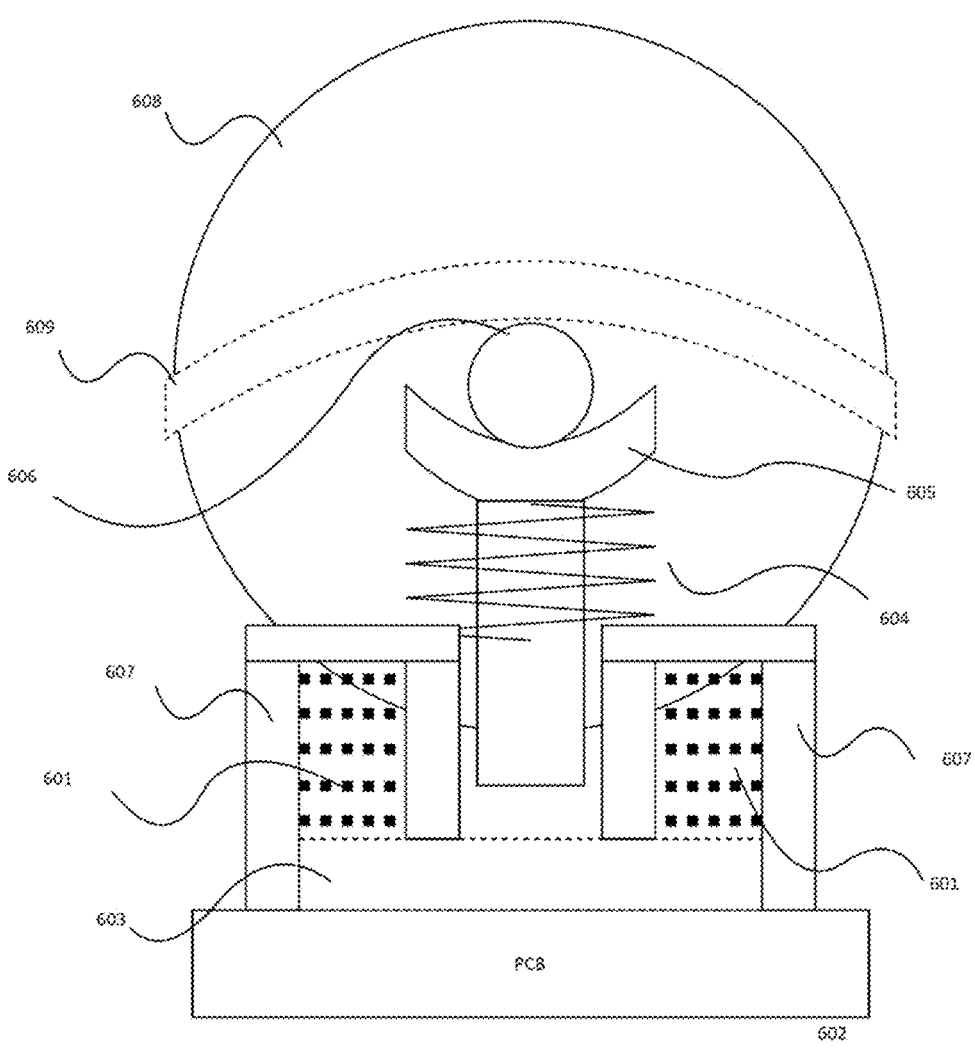
Figure 6C:
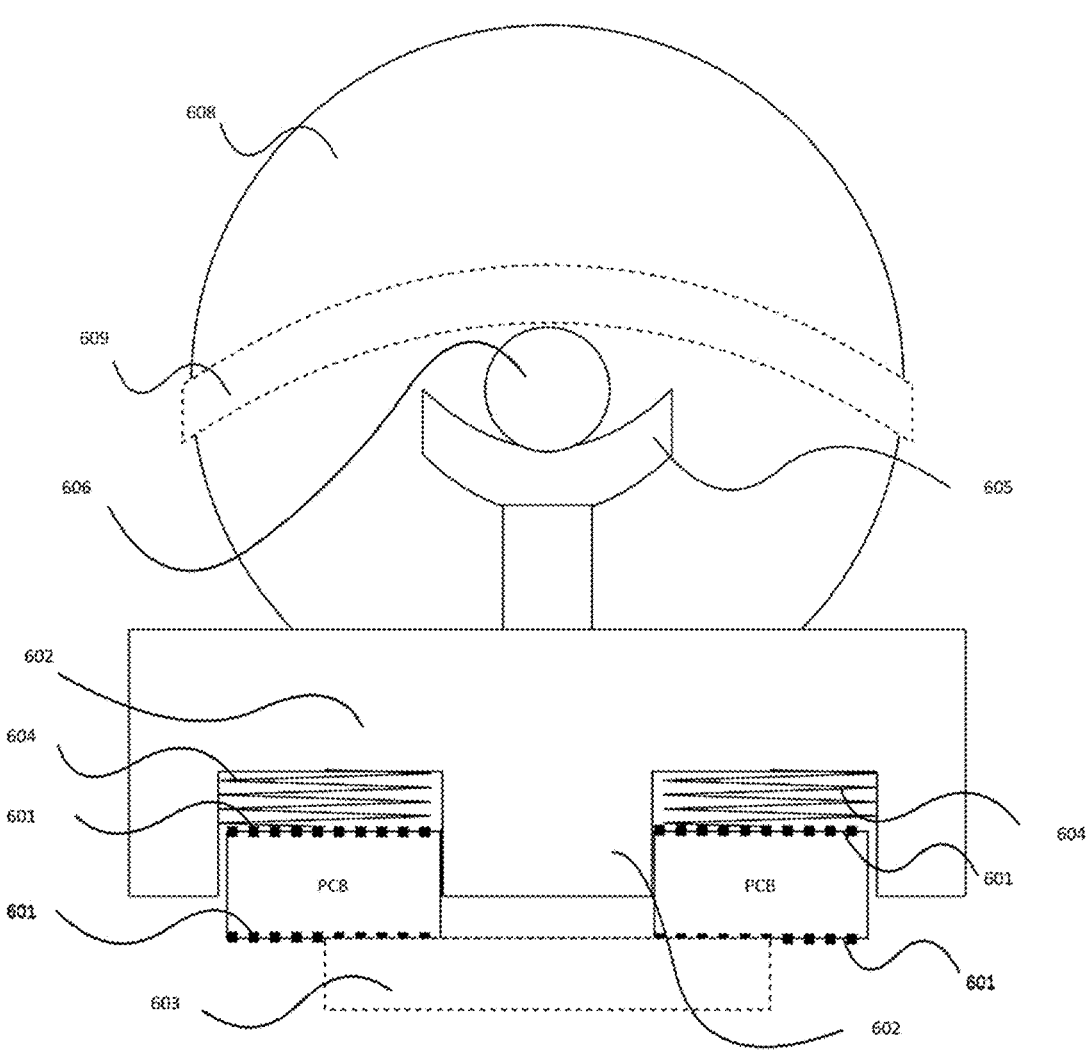
Figure 6D:
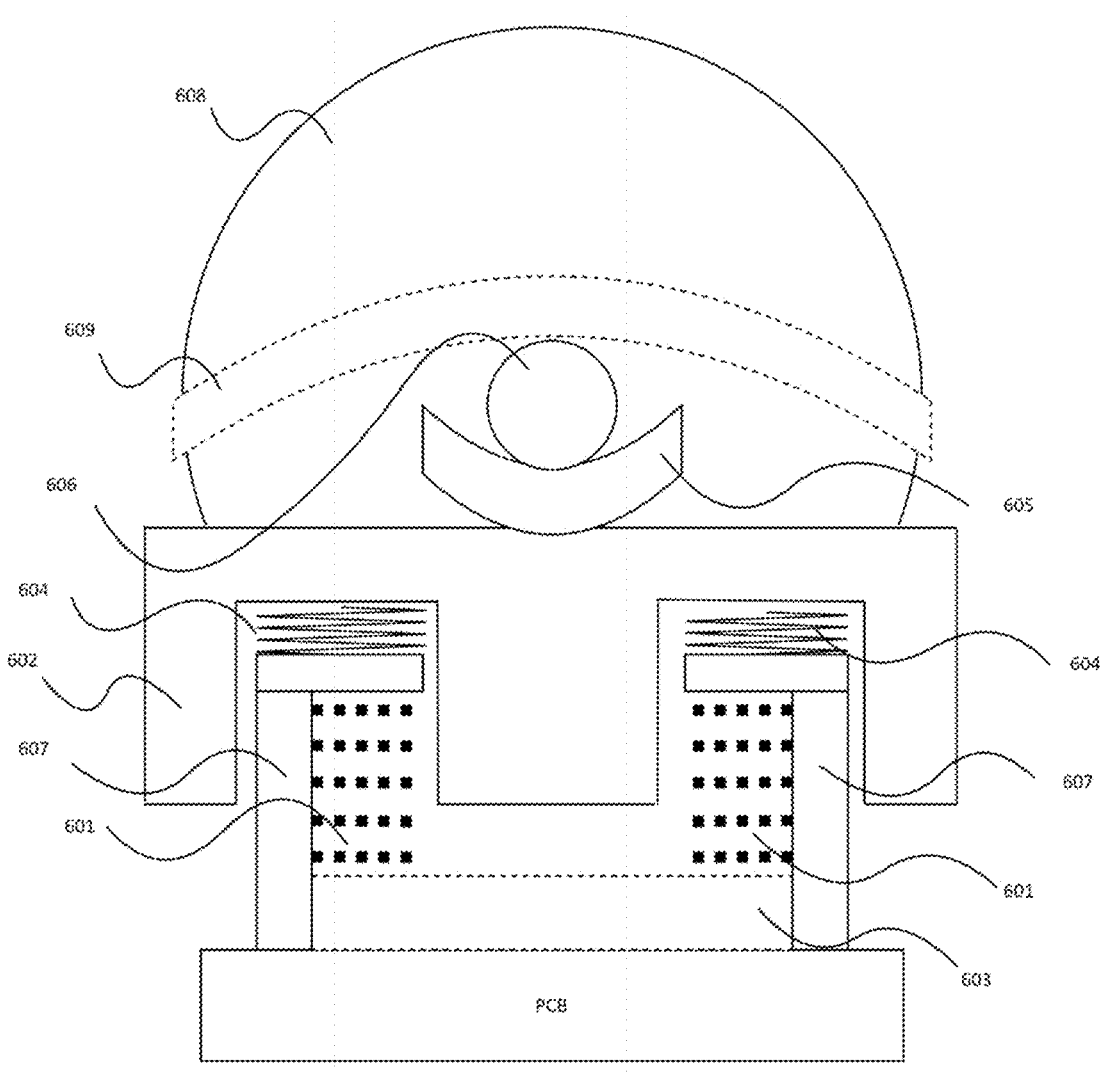

FIGS. 6b and 6d illustrate discrete wire wound coils 601. This design allows more flexibility with regards to the design of the coil. For example, wire thickness, wrapping density and number of windings can be changed beyond the parameters possible on standard pcb manufacturing techniques.

FIGS. 6c and 6d show an interfering member 602 shaped so it can pass on both an outside and on an inside or core side of the coil 601. This provides a path of lower resistance than the air for the magnetic field, increasing the change in inductance, and the force that can be exerted per unit current passing through the core. In an embodiment using this invention in a track pad, the example shown in FIG. 6c can be used and the track pad can form part of or be attached to a top surface or a bottom surface of the pcb, furthermore the high permeability member 602 can be held stationary (for example attaching it to the housing of a computer) then the member 602 will be pulled downwards when the coil 601 is energized and in another configuration the high permeable part 602 can held stationary which will result in the part 603 moving in an upwards direction. With the PCB attached to the moving part (602 or 603) the PCB can be made to move up or down when the coil 601 is energized. In the track pad application the elements 605, 606, 608 and 609 will not be present. The spring 604 can also be formed by the track pad bracket (not shown) and not be present in this form. The member 603 may be formed by a metal area on the bottom layer of the track pad PCB.

The haptic signal is generated for example by movement induced on the PCB by magnetic attraction formed between the highly permeable member 602 and the highly permeable member 603 when the coil 201 is energized. Depending on the configuration the PCB, and the members 602 and 603 and which are kept stationary a track pad surface can be moved away from a user's finger or towards a user's finger.

In the track pad force sensing mode the inductance of coils 601 are measured, and there can typically be four coils 601, a coil 601 in each corner of the track pad. When a force is applied to the cover layer of the computer track pad, the bracket and/or other spring mechanism allows a small displacement resulting in the members 602 and 603 moving closer to each other. This will affect the combined inductance measured in all the coils 601 in a way that the displacement can be deduced. The spring 604 shown can be used as an example—the more force applied on the track pad surface the more the spring 604 will compress and the closer the member 602 will come to the member 603. Since these members (602, 603) are made of high permeability materials the smaller the gap between them the more inductance will be measured.

In a typical track pad embodiment the high permeability member 602 may be a ferrite structure inverted from what is shown in FIG. 6c and the member 602 is firmly attached to an housing (e.g. laptop) and the PCB with coil 601 are positioned as shown and without the spring 604 (no 605, 606, 608 or 609) and with the high permeability member 603 on top and forming part of the bottom layer of the track pad PCB. A spring mechanism is attached to the track pad PCB to keep the space between member 602 and the coil 601 PCB in place, when the coil 601 is energized the member 603 and the track pad of which the member 603 is a part of the bottoms layer, is momentarily pulled closer to the member 602 which is fixed to the housing. This means that when the coil 601 is energized the track pad PCB will experience a displacement relative to the housing.

Figure 7:
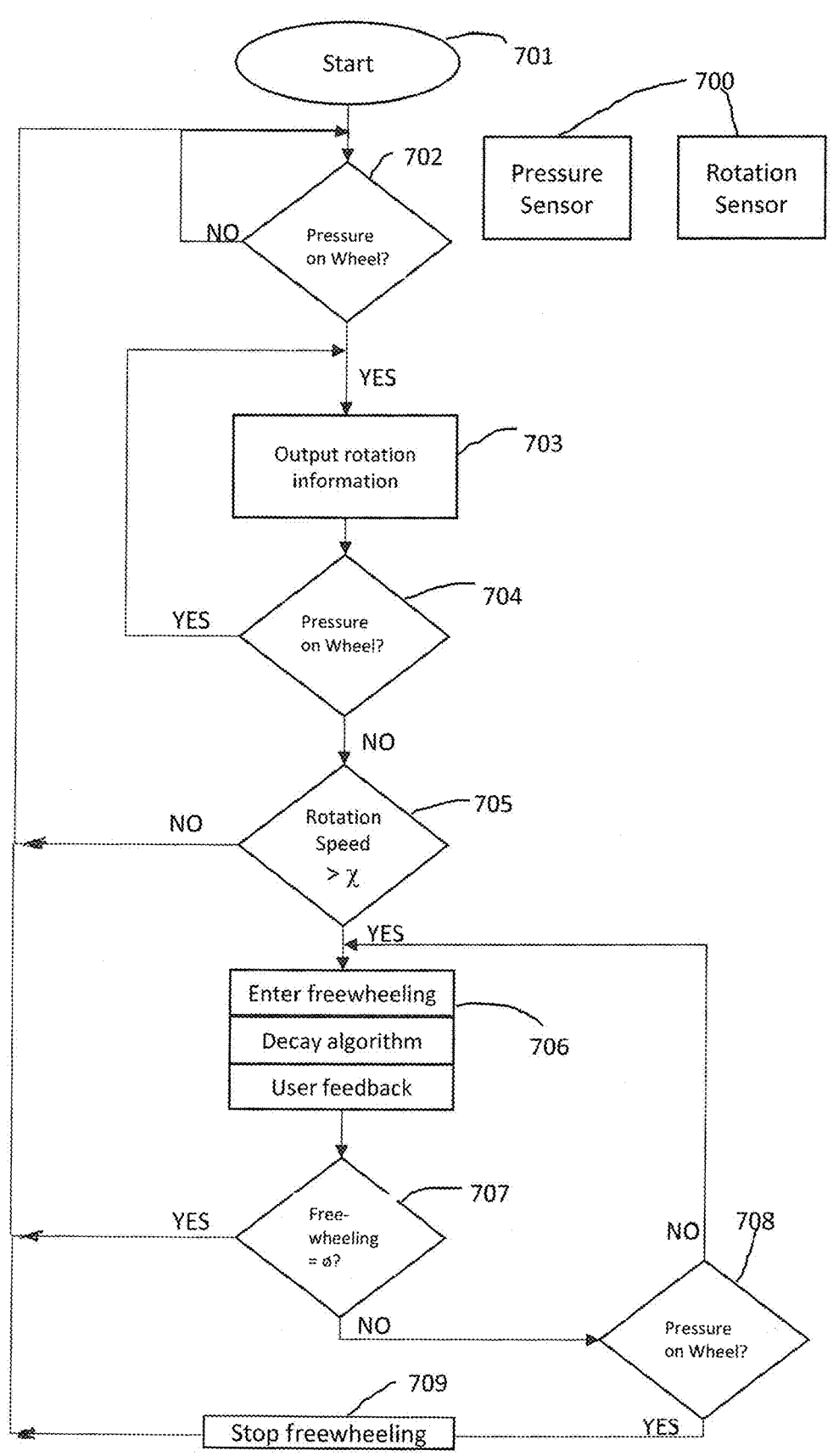
FIG. 7 is a flowchart of freewheeling operation in terms of the invention.

In FIG. 7 a flow chart is shown to describe an exemplary freewheeling controller operation. The controller has access to the output of the force sensor that responds to downwards pressure that is applied to the center mouse wheel as well as the center wheel rotation sensor output.

Assuming a startup 701 condition with no touch and no rotation, the flow goes to checking for pressure 702 (i.e. user contact) on the center wheel.

If no pressure is detected, the process is repeated. If pressure is detected the controller uses the rotational information as output 703 to the computer to which it is connected. The controller keeps on doing this at a predetermined data rate for as long as pressure 704 is detected on the center mouse wheel.

When the user loses contact with the wheel (no pressure 704) the controller checks for freewheeling requirements. For example if the wheel is standing still or very slow rotation is detected, the flow is branched back to check for pressure detection 702, but if the rotation speed was higher than a predetermined speed it implements the virtual freewheeling function 706.

Various virtual freewheeling implementation algorithms can be used. For example continuous freewheeling at one speed can be maintained, or the freewheeling (speed and time) is reduced using a decay algorithm. Information from the computer can also be used. For example if the end of a document has been reached the freewheeling is halted.

When either the freewheeling has decayed or halted to standstill 707 or when pressure is detected on the center mouse wheel 708 and the freewheeling is stopped 709, the flow goes back to post start 702.

In the freewheeling function 706 user feedback can also be generated with haptics or otherwise.

The invention claimed is:

1. A product comprising a housing, a wheel which is rotatably mounted to the housing, a first sensor which in response to force on the wheel produces a first signal related to said force, a second sensor which in response to rotation of the wheel produces a second signal related to said rotation, a controller and wherein the controller, responsive to the first and second signals, implements a freewheeling output independently of continued rotation of the center wheel, wherein the first sensor comprises an inductive measurement system and wherein said product includes an electromechanical switch which is activated when a user applied force to the said wheel exceeds a predetermined level, and wherein the first sensor is also used to detect the activation of said electromechanical switch and the said electromechanical switch is not electrically connected to the controller.

2. A product in accordance with claim 1, wherein the second sensor comprise a magnet which is attached to an axle of the wheel and a Hall effect sensor which is responsive to rotational movement of the magnet and said Hall sensor provides related rotation information to said controller.

3. A product comprising a housing, a wheel which is rotatably mounted to the housing, a first sensor which in response to force on the wheel produces a first signal related to said force, a second sensor which in response to rotation of the wheel produces a second signal related to said rotation, a controller and wherein the controller, responsive to the first and second signals, implements a freewheeling output independently of continued rotation of the center wheel, wherein the first sensor comprises an inductive measurement system which detects when the force on the wheel reaches a predetermined level and wherein haptic user feedback signals are used to indicate that the force on the wheel has exceeded a predetermined level, and to report rotation of the wheel measured by the second sensor and to indicate virtual freewheeling rotation of the wheel even when the wheel may be stationary.

4. A product in accordance with claim 3 wherein the inductive measurement system comprises an inductive coil and wherein the haptic user feedback signals are generated using the said inductive coil of the inductive measurement system.

5. A product comprising a housing, a wheel which is rotatably mounted to the housing, a first sensor which in response to force on the wheel produces a first signal related to said force, a second sensor which in response to rotation of the wheel produces a second signal related to said rotation, a controller and wherein the controller, responsive to the first and second signals, implements a freewheeling output independently of continued rotation of the center wheel, wherein said first sensor comprises an inductive measurement system and wherein said freewheeling output is implemented when said force on the center wheel is removed and, more or less simultaneously, the measured rotational speed of the said wheel exceeds a predefined minimum rotational speed.

6. A product in accordance with claim 5 wherein said freewheeling output is halted when the first sensor detects a force on the center wheel while freewheeling is active.

7. A product in accordance with claim 5 wherein said freewheeling output is halted when from a stationary center wheel status a rotational movement is detected on the wheel.

8. A product in accordance with claim 2 wherein the product is a computer mouse and wherein said wheel is mounted in a way that it is partially embedded in the housing.

9. A method wherein a virtual rotation (freewheeling) of a wheel is implemented using information derived from a first sensor measuring force applied by a user to the wheel, which includes the steps of using inductive measurements to implement the first sensor, using Hall effect sensing to monitor rotational information of said wheel; using an electromechanical switch which is not electrically connected to detect if pressure exceeding a predetermined level is applied to the said wheel, and to affect the inductance of the first sensor through changing eddy currents and of deriving information about the switching of the electromechanical switch from said inductance measurements.

10. A method in accordance with claim 9 wherein a step of providing user feedback about normal or virtual wheel rotation is done using haptics.

11. A method in accordance with claim 10 which includes the steps of using the first sensor to determine switch input level into the first sensor and reporting such decision to the user using haptic feedback.

12. A method in accordance with claim 11 which includes the step of using an inductor to implement the first sensor and the same inductor to implement the haptic signal generator.

13. A method in accordance with claim 9 which is applied to a wheel that forms a part of a user interface of a computer mouse.

\* \* \* \* \*